United States Patent
Stott et al.

[19]

[11] Patent Number: 6,130,922
[45] Date of Patent: Oct. 10, 2000

[54] DEMODULATING DIGITAL VIDEO BROADCAST SIGNALS

[75] Inventors: Jonathan Highton Stott, Horley; Justin David Mitchell; Christopher Keith Perry Clarke, both of Crawley; Adrian Paul Robinson; Oliver Paul Haffenden, both of London, all of United Kingdom; Philippe Sadot, Ville d'Avray, France; Lauret Regis, Sonchamp, France; Jean-Marc Guyot, Paris, France

[73] Assignee: LSI Logic Corporation, Milpitas, Calif.

[21] Appl. No.: 09/071,588

[22] Filed: May 1, 1998

Related U.S. Application Data
[60] Provisional application No. 60/054,195, Jul. 30, 1997.

[30] Foreign Application Priority Data

| May 2, 1997 | [GB] | United Kingdom | 9709063 |
| Dec. 22, 1997 | [GB] | United Kingdom | 9727112 |
| Dec. 22, 1997 | [GB] | United Kingdom | 9727113 |
| Apr. 27, 1998 | [GB] | United Kingdom | 9808993 |

[51] Int. Cl.[7] .................................................. H04L 27/06
[52] U.S. Cl. .................. 375/344; 455/182.2; 455/192.2; 455/192.3
[58] Field of Search ...................................... 375/316, 344, 375/354, 355, 362; 370/480, 464, 498, 503, 520; 455/192.2, 192.3, 182.2, 182.3, 179.1, 150.1, 192.1

[56] References Cited

U.S. PATENT DOCUMENTS

| 5,400,368 | 3/1995 | Cheng et al. | 375/354 |
| 5,438,595 | 8/1995 | Cheng et al. | 375/340 |
| 5,550,812 | 8/1996 | Philips | 370/203 |
| 5,581,579 | 12/1996 | Lin et al. | 375/331 |
| 5,999,561 | 12/1999 | Naden et al. | 375/141 |

*Primary Examiner*—Stephen Chin
*Assistant Examiner*—Lenny Jiang

[57] ABSTRACT

Apparatus for demodulating digital video broadcast signals with an improved mechanism for automatic frequency control including data modulated on a multiplicity of spaced carrier frequencies. The apparatus includes an analog to digital converter for providing a series of digital samples of the broadcast signal, a Fourier Transformer for analyzing the samples to provide a series of data signal values for each carrier frequency, signal processor for processing the series of data signal values including the phase-error-correcter, and automatic frequency controller for controlling the frequency of the signals input to the Fourier Transformer. The automatic frequency controller includes coarse frequency controller for controlling the frequency in terms of increments of the carrier spacing frequency, and fine frequency controller for controlling the frequency for values less than a single carrier spacing frequency interval. The coarse frequency controller includes a recursive filter for assessing a predetermined number (N) of carrier signals on either side of the nominal position of a predetermined continual pilot signal, to determine which signal best represents the continual pilot signal, whereby to determine the coarse frequency error.

21 Claims, 8 Drawing Sheets

Fig.4A.
COARSE AND FINE FREQUENCY OFFSET

Fig.4B.
VALUE OF THE SECOND PHASE DIFFERENCE
AT EACH CARRIER

— SCATTERED CARRIERS    — CONTINUAL CARRIERS
— DATA CARRIERS         — TPS CARRIERS

Fig.4C.
COARSE RECOVERY PRINCIPLE

← SCATTERED CARRIERS   — CONTINUAL CARRIERS
← DATA CARRIERS        — TPS CARRIERS

Fig.5.

Fig.6.
HIGH COST SOLUTION, NOISE OPTIMUM

Fig.11. CARRIER INDICES FOR CONTINUAL PILOT CARRIERS

| CONTINUAL PILOT CARRIER POSITIONS (INDEX NUMBER k) | |
|---|---|
| 2k MODE | 8k MODE |
| 0  48  54  87 141 156 192 201 255 279 282 333 | 0  48  54  87 141 156 192 201 255 279 282 333 |
| 432 450 483 525 531 618 636 714 759 765 780 | 432 450 483 525 531 618 636 714 759 765 780 |
| 804 873 888 918 939 942 969 984 1050 1101 | 804 873 888 918 939 942 969 984 1050 1101 |
| 1107 1110 1137 1140 1146 1206 1269 1323 | 1107 1110 1137 1140 1146 1206 1269 1323 |
| 1377 1491 1683 1704 | 1377 1491 1683 1704 1752 1758 1791 1845 |
| | 1860 1896 1905 1959 1983 1986 2037 2136 |
| | 2154 2187 2229 2235 2322 2340 2418 2463 |
| | 2469 2484 2508 2577 2592 2622 2643 2646 |
| | 2673 2688 2754 2805 2811 2814 2841 2844 |
| | 2850 2910 2973 3027 3081 3195 3387 3408 |
| | 3456 3462 3495 3549 3564 3600 3609 3663 |
| | 3687 3690 3741 3840 3858 3891 3933 3939 |
| | 4026 4044 4122 4167 4173 4188 4212 4281 |
| | 4296 4326 4347 4350 4377 4392 4458 4509 |
| | 4515 4518 4545 4548 4554 4614 4677 4731 |
| | 4785 4899 5091 5112 5160 5166 5199 5253 |
| | 5268 5304 5313 5367 5391 5394 5445 5544 |
| | 5562 5595 5637 5643 5730 5748 5826 5871 |
| | 5877 5892 5916 5985 6000 6030 6051 6054 |
| | 6081 6096 6162 6213 6219 6222 6249 6252 |
| | 6258 6318 6381 6435 6489 6603 6795 6816 |

DEMODULATING DIGITAL VIDEO BROADCAST SIGNALS

This application claims priority from U.S. provisional application Ser. No. 60/054,195, filed Jul. 30, 1997.

This invention relates to demodulating digital video broadcast (DVB) signals.

There are currently two major types of DVB, namely, terrestrial broadcasting and satellite/cable broadcasting. The invention is particularly, though not exclusively concerned with terrestrial broadcasting, which has special problems, particularly in communication channel impairment, arising from adjacent television channels, multipath and co-channel interference, for example. A type of transmission which has been developed to meet these problems is known as Coded Orthogonal Frequency Division Multiplexing (COFDM)— see for example "Explaining Some of the Magic of COFDM" Stott, J. H.—"Proceedings of 20th International Television Symposium, Montreux, June 1997. In COFDM, transmitted data is transmitted over a large number of carrier frequencies (1705 or 6817 for DVB), spaced (by the inverse of the active symbol period) so as to be orthogonal with each other; the data is convolutionally coded, to enable soft-decision (Viterbi) decoding. Metrics for COFDM include Channel State Information (CSI) which represents the degree of confidence in each channel for reliably transmitting data.

Modulation and Demodulation of the carriers may be carried out by a Fast Fourier Transform (FFT) algorithm performing Discrete Fourier Transform operations.

Subsequent to demodulation, signal processing corrections are carried out such as channel equalisation, channel state information correction, phase error correction, and automatic frequency control. The demodulated and corrected signal may then be decoded in an FEC (forward error correction decoder) for recovery of data.

Automatic frequency control is important, since frequency offsets may appear after down-conversion to an intermediate frequency, because of variations in local oscillator frequency. Such frequency offsets are lethal for frequency recovery, and must therefore be reduced to a minimum.

In regard to phase error correction, a principal problem is that of local oscillator phase-noise. The addition of local oscillator phase noise to an COFDM signal has two notable effects:

1) To rotate the received constellation by an amount which is the same for all the carriers within any one OFDM symbol, but varying randomly from symbol to symbol. This is called the Common Phase Error (CPE), and primarily results from the lower-frequency components of the phase-noise spectrum; and
2) To add Inter-Carrier Interference (ICI) of a random character similar to additive thermal noise. ICI primarily results from the higher-frequency components of the phase-noise spectrum. ICI cannot be corrected and must be allowed for in the noise budget. It can be kept small in comparison with thermal noise by suitable local oscillator design.

GB-A-2307155 describes (see Sec 2.1, p.7 and FIG. 11) an arrangement for automatic frequency control wherein it is recognized that the phase of the retrieved signals in OFDM is proportional to frequency error, and therefore a signal representing phase can be used to control the frequency of a local oscillator.

SUMMARY OF THE INVENTION

It is an object of the present invention to provide a method of automatic frequency control in a receiver for COFDM signals.

The invention is based on the recognition that, although the phase variation between adjacent symbols in COFDM is random, for continual pilot signals, as defined in the ETSI Specification, the phase variation of the signals is constant between adjacent symbol intervals. The phase difference between adjacent symbol intervals in the continual pilot signals is primarily of use for common phase error correction, but it may also be employed for automatic frequency control since frequency variations are proportional to the change of phase.

Further, in accordance with the invention, it is recognized that frequency control may be split into two separate controls, namely coarse control for frequency offsets of integral numbers of carrier spacing intervals, and fine frequency control for frequency offsets of fractions of a carrier spacing interval.

For frequency offsets less than one carrier interval, the phase change may be used as representing the fine frequency offset. For coarse frequency control, a signal is used representing rate of change of phase. Since the phase variation between adjacent symbol intervals in continual pilots is constant, a second difference of phase error representing rate of change of phase error should be zero. This therefore provides a means of locating the continual pilot where the coarse frequency offset is a plurality of carrier spacings from the nominal position.

The invention provides an apparatus for demodulating digital video broadcast signals comprising data modulated on a multiplicity of spaced carrier frequencies, including:

analog to digital conversion means for providing a series of digital samples of the broadcast signal, transform means for analyzing the samples to provide a series of data symbol values for each carrier frequency, signal processing means for processing the series of data signal values including phase-error-correcting means, and automatic frequency control means for controlling the frequency of the signals input to the transform means, wherein the automatic frequency control means includes coarse frequency control means for controlling the frequency in terms of increments of the carrier spacing frequency, and fine frequency control means for controlling the frequency for values less than a single carrier spacing frequency interval, wherein the coarse frequency means includes a filter means for assessing a group of a predetermined number (N) of carrier signals on either side of the nominal position of a plurality of predetermined continual pilot signals to determine which signal best represents the continual pilot signal, whereby to determine the coarse frequency error.

As preferred, the rate of change of phase (second difference) of said predetermined number of carrier signals between consecutive symbol intervals is determined, and applied as inputs to the filter means.

Various configurations of filter may be envisaged. It would be possible to provide a separate filter could for each carrier signal or group of carrier signals assessed, which would however be very expensive in terms of hardware. However it is realized in accordance with the invention that the coarse frequency error will normally be the same for all carriers, and hence a filter can be arranged to operate on samples of carriers which are the same spacing from the theoretical position of the pilot in consecutive groups of carriers. Thus usually filtering will be carried out over a number of symbol intervals, and in each symbol interval a plurality of pilot signals are assessed. In accordance with the invention, it is preferred in order to reduce hardware to provide a single filter means with access to a memory store in which the filtered samples for each carrier position are stored and accessed and updated as required; hence a memory store with 2N+1 locations is required.

Preferably, the filter means comprises a recursive filter for providing an output representative of the accumulated value of a plurality of previous input values for the respective carrier positions, and the minimum value of the accumulated values is selected as representing the continual pilot, and the coarse frequency offset is determined accordingly.

BRIEF DESCRIPTION OF THE DRAWINGS

A preferred embodiment of the invention will now be described with reference to the accompanying drawings, in which.

DESCRIPTION OF THE PREFERRED EMBODIMENTS

The preferred embodiment of the present invention comprises a front end for digital terrestrial television transmitted according to the DVB-T specification. The front end consists of two separate components. First, an analog down-converter that converts the input signal from UHF to a low IF. Second, an integrated circuit that accepts the analog signal from the down-converter and performs the required DSP operations, which include synchronization and demodulation, to form a stream of soft decisions suitable for presentation to an FEC decoder (Forward Error Correction decoder).

Full compliance to the DVB-T specification means that the chip is capable of decoding signals transmitted in the following modes:
1) A signal that contains either 1705 or 6817 active carriers, commonly referred to as 2K and 8K respectively. The chip includes the functionality and memory required to perform the FFT algorithm in both modes.
2) Non-hierarchical QPSK, 16-QAM and 64-QAM constellations.
3) Hierarchical 16-QAM and 64-QAM constellations, either uniform or non-uniform with the possible scale factors $\alpha=2$ and $\alpha=4$.
4) Guard intervals ¼, ⅛, 1/16 and 1/32 of the OFDM symbol length.
5) Viterbi code rates ½, ⅔, ¾, ⅚ and ⅞.

Figure 1:
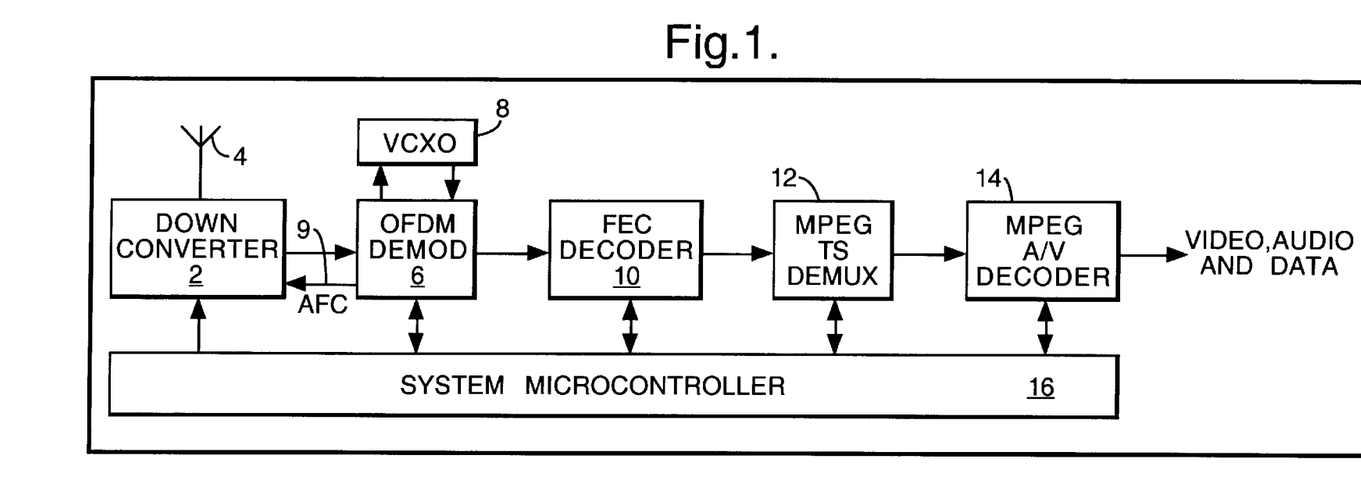
FIG. 1 is a schematic block diagram of digital terrestrial front end converter incorporating the present invention.

Referring now to FIG. 1, a block diagram of the front end system, a down-converter 2 receives the input UHF broadcast signal from an antenna 4 and converts the carrier signal to a first IF frequency of 30–40 MHz and then to a second IF frequency of 4.57 MHz. Since the bandwidth of the modulated data is about 7.6 MHz, this second IF signal is sufficiently low in frequency to present the signal as a base band signal to a demodulator chip 6. Demodulator chip digitises the incoming signal at a rate determined by a voltage controlled oscillator 8, and provides an Automatic Frequency Control on a line 9 to down-converter 2. The output of demodulator 6 represents demodulated data and is fed to a FEC decoder 10 (Forward Error Correction or Viterbi decoder) for recovering the data. The decoded data is fed to a transport stream demultiplexer 12 and then to an audio-visual decoder 14. The front end is controlled by a system microcontroller 16.

Figure 2:
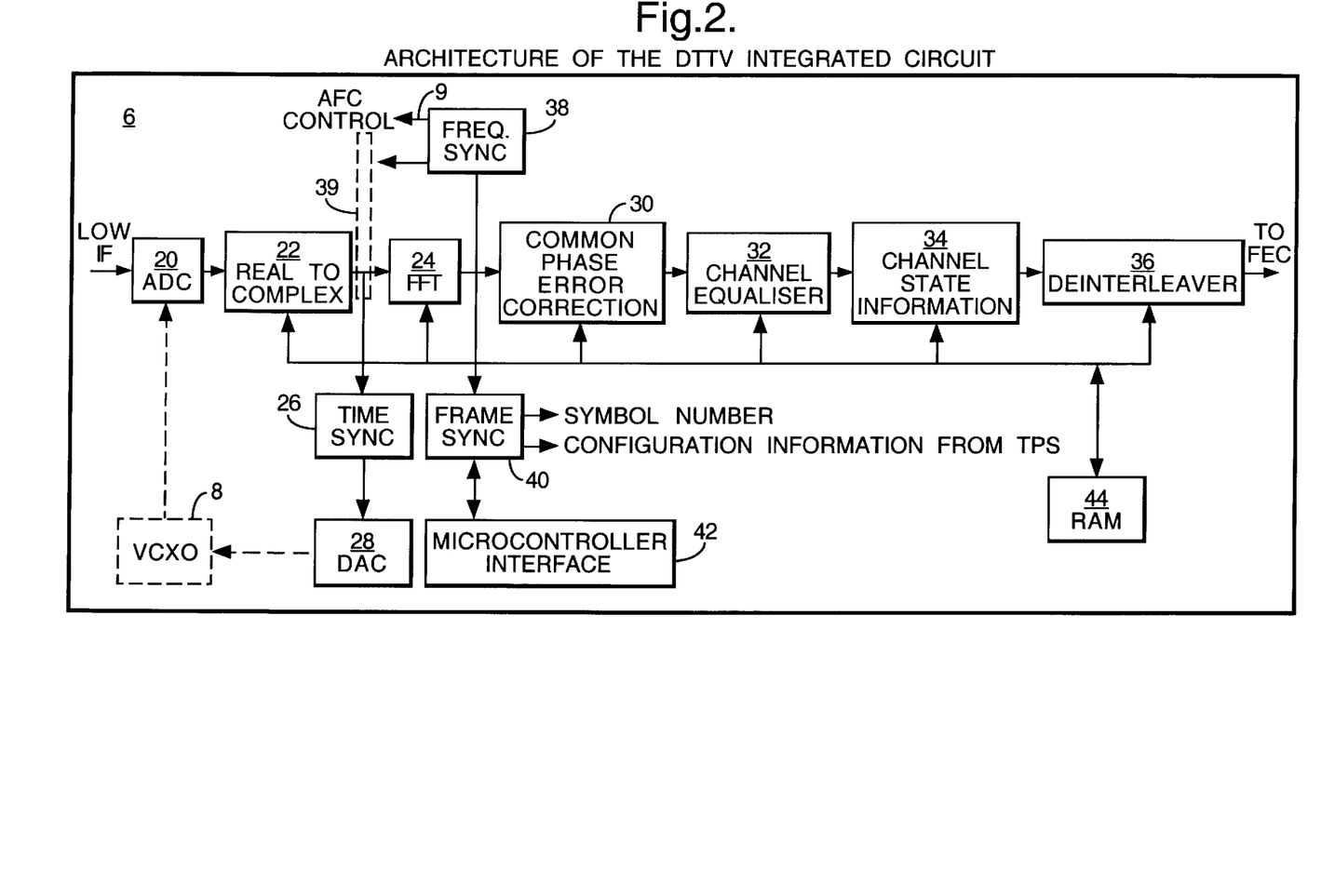
FIG. 2 is more detailed block diagram of demodulating apparatus according to the invention forming part of the converter of FIG. 1.
Figure 3:
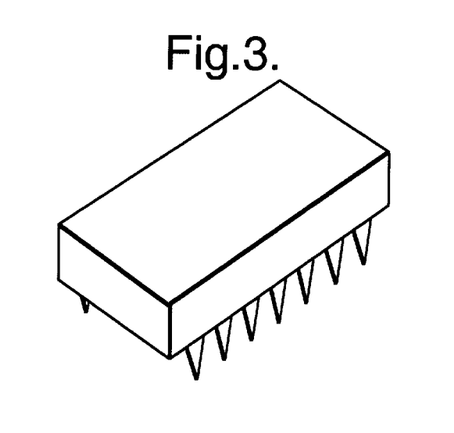
FIG. 3 is a schematic view of a chip incorporating the apparatus of FIG. 2.

Referring now to FIG. 2, this shows the demodulator chip 6 in more detail. The chip itself is shown schematically in FIG. 3. The low second IF is fed to an analog digital converter which samples the IF signal at a frequency of 18.29 MHz (×4 the second IF frequency of 4.57 MHz), in an analog to digital converter 20. The digital output samples are fed to a real to complex converter 22 which converts the digital samples to complex number values in order to provide a complex signal centred on zero frequency. This signal is fed to a Fast Fourier Transform device (FFT) 24 and to a timing synchronization unit 26 which derives a value from the complex input signal which is fed to a digital to analog converter 28 to supply an analog control voltage to a voltage controlled oscillator 8, which provides a sampling clock signal to analog to digital converter 20.

The FFT device 24 has four modes of operation. Firstly, it is capable of performing either a 2048 point or an 8192 point transform. Second, it is capable of performing the transform in either direction. The inverse FFT functionality is provided so that the integrated circuit may be used in applications requiring OFDM modulation. In any event, the FFT performs a series of discrete Fourier transforms on each carrier frequency to provide at an output the data symbols for each carrier frequency. These output signals are corrected in phase at a common phase error generator unit 30 and then passed to a channel equalizer 32, a channel state information correction unit 34 and a deinterleaver 36. The signal thus processed is then passed at an output from the demodulator to forward error correction unit 8. The phase error correction block 30 calculates the common phase error of the signal and applies the necessary correction. The channel equalizer 32 first performs linear temporal equalization followed by frequency equalization using a high order interpolating filter. The equalizer outputs an equalized constellation to the channel state information unit 34. Unit 34 generates 3 or 4 bit soft decisions which are suitable for presentation to a Viterbi decoder. Deinterleaver 36 performs firstly symbol deinterleaving followed by bit deinterleaving.

In addition, the output signals from FFT 24 are passed to a frequency synchronization unit 38 and converts it to a control signal for automatic frequency control, which acts upon a local oscillator in down-converter unit 2 for adjusting the frequency of the first or second IF. In a modification, a control signal from unit 38 is fed to a direct digital frequency shifter (DDFS) (indicated in dotted lines). In a further modification, units 30 and 38 are combined.

In addition, the output of FFT 24 is fed to a frame synchronization unit 40. A microcontroller interface 42 is provided, and in addition RAM memory 44 is provided to which all the units 22, 24, 30–36 have access to in order to provide their required operations.

Analog Versus Digital AFC

One of the processes that is required in the synchronization of the demodulator is to obtain frequency synchronization. There is a choice as to whether to apply the required frequency shift as an analog correction in the down-converter 2, or as a digital frequency shift in the demodulator chip.

Analog Frequency Correction

If the frequency correction is implemented by adjusting the frequency of the reference crystal in the down-converter 2, then a control signal on line 9 is provided from the output of the integrated circuit 6 back to the down-converter. This method has the advantage that a SAW filter inside the down-converter can be made as narrow as possible. The disadvantages are twofold. First, the integrated circuit must pass a control signal back to the down-converter. Second, the architecture of the down-converter is made more complicated since the control signal must adjust the reference crystal within the search range of the AFC.

Digital Frequency Correction

If the frequency correction is implemented in the integrated circuit 6 in DDPS 39, then the architecture of the down-converter 2 is made much simpler since there is no longer any need to have a control signal from the chip 6, and the loop in the down-converter that drives the reference crystal is no longer required. The disadvantage of this method is that the bandwidth of the SAW filter must be increased by the AFC search range. This causes a significant penalty in terms of the adjacent channel protection ratio when the receiver is used in an environment where the existing analog services are operated in adjacent channels to digital services. The architecture described will permit both analog and digital correction.

As regards common phase error correction, this in practice combined with generation of the control signal in unit 38 for automatic frequency control. Both measurements are based on the phase rotation between one symbol and the next, measured on the continual pilots (CP's).

If a constant AFC error is present, there will be a constant change of rotation between successive symbols, proportional to the frequency error. Low frequency phase-noise will have a similar effect; rotating all of the carriers by the same angle, but this angle will vary from symbol to symbol in a random manner. In both cases it is desirable to attempt to correct the phase error on the current symbol by applying the opposite phase rotation to all carriers—this process is known as common-phase-error correction.

In addition to the phase rotation effect, an AFC error will also cause inter-carrier interference (ICI) which cannot be corrected for—for this reason it is also necessary to feed back an error signal to drive the frequency error to zero. This error signal can be applied to either in the analog domain as the local-oscillator control voltage, or in the digital domain to a DDFS which must be situated before the FFT. In either case an appropriate loop filter is included.

The measurement of phase rotations can only resolve AFC errors of up to roughly one half of the carrier spacing in either direction. In practice, during acquisition the AFC error is likely to be much greater than this. For this reason the AFC measurement also includes a "coarse" part, which measures the number of whole carriers by which the frequency is wrong. This is done using a pattern-matching approach looking for the continual pilots.

Figure 4A:
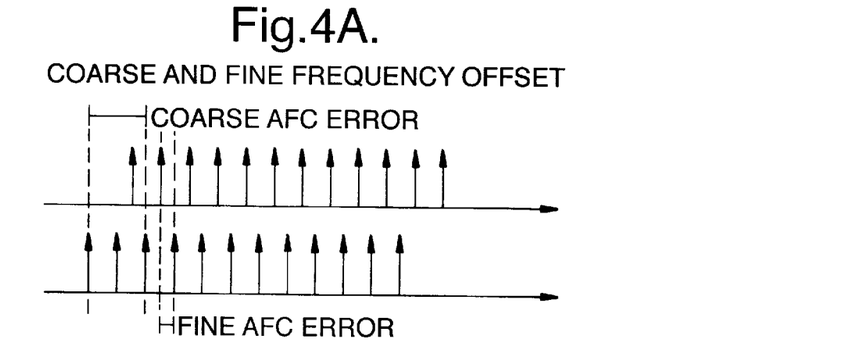
FIGS. 4A, 4B and 4C are diagrams illustrating the recovery of coarse frequency error.
Figure 4B:
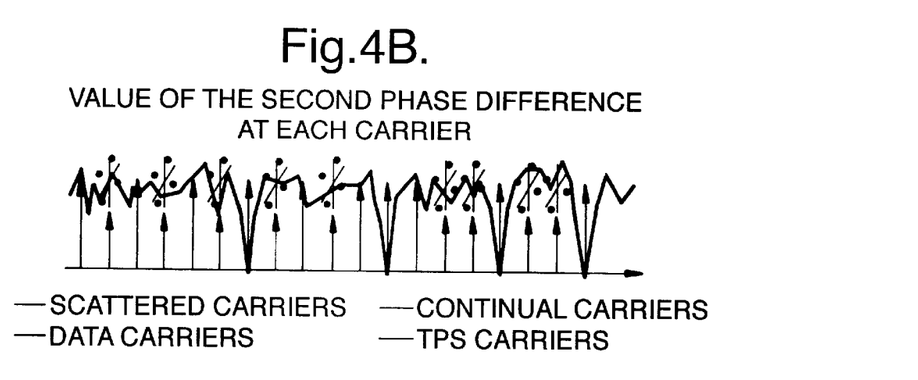
Figure 4C:
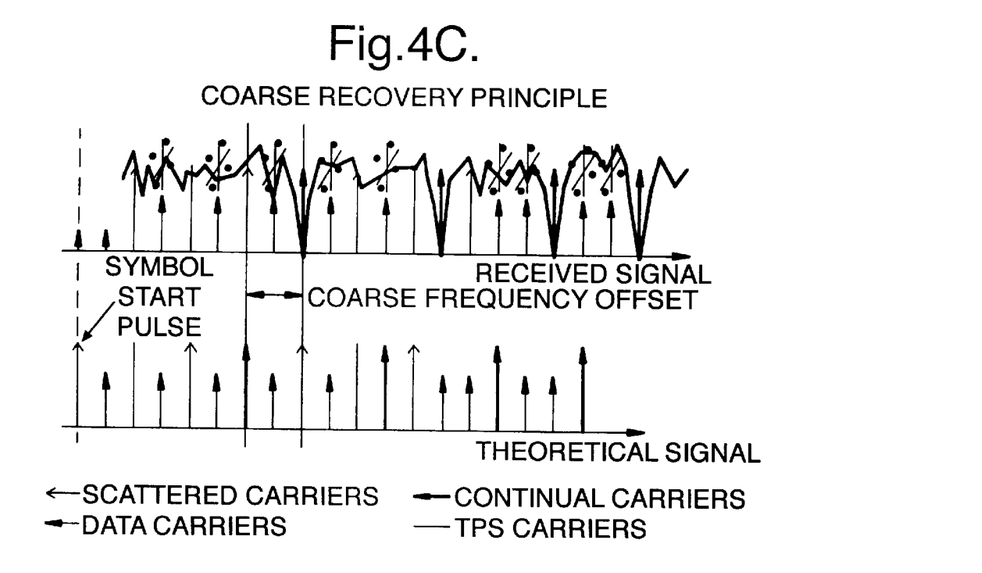

Referring to FIG. 4, a frequency offset can therefore be viewed as a shift of all the carriers either to the left of to the right. The frequency offset is divided in two parts, a Coarse Frequency Offset: a multiple of the carrier spacing; and a Fine Frequency Offset: an offset less than the carrier spacing.

Figure 11:
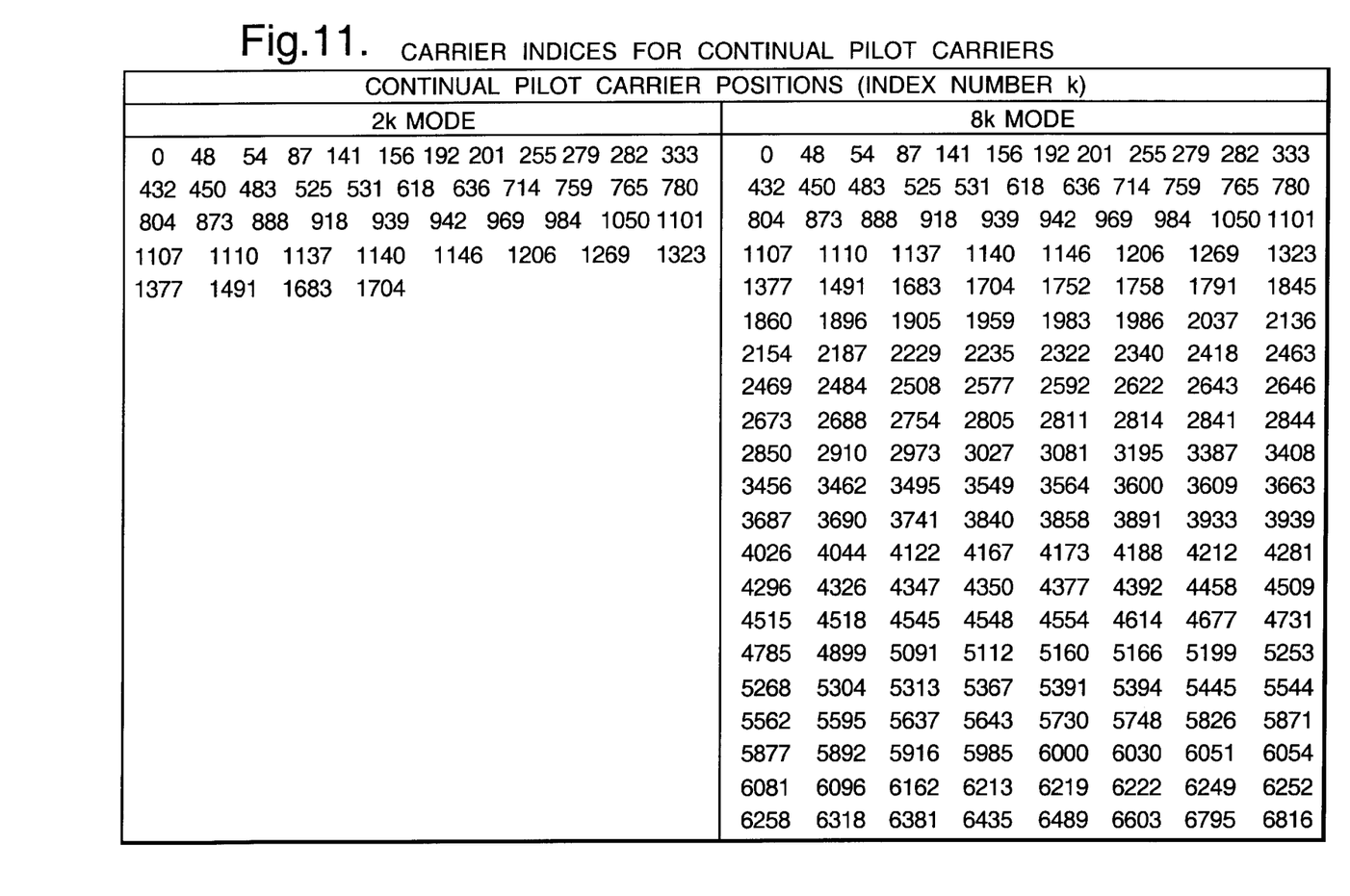
FIG. 11 is a table showing positions of continual pilot signals in the DVB-T 2K and 8K modes.

The OFDM signal is formed with a group of four different types of carriers, which are data carriers, continual pilots, scattered pilot and TPS pilots. Their positions are well defined by DVB-T specification. The continual pilots are always transmitted at the same defined position from OFDM symbol to OFDM symbol, as shown in FIG. 11, which is taken from the ETSI standard for DVB, no. ETS 300 744; for each OFDM symbol; continual pilots transmit exactly the same known reference sequence at a boosted power level relative to data carriers.

A fixed frequency offset rotates all carriers with the same phase from symbol to symbol. Therefore, the first phase difference between two carriers at the same index k belonging to two consecutive OFDM symbol gives the amount of frequency offset modulo $\pi$. This can be shown as follows:

Symbol m, with N carriers, on a frequency $F_0$ lasting $T_T$ with a carrier spacing of $w_s$ may be written:

$$s(t) = \sum_{k=0}^{N-1} R_{k,m} e^{j(w_0 t + k w_s (t - m T_T))} \quad (1)$$

$$m T_T < t < m T_T + T_s$$

The symbol is assumed to be integrated on Ts whereas it is sent through the Channel during $T_T = T_s + T_{Guard}$. Assuming a frequency offset of $\Delta w_0 = n w_s + \delta w_0$, the 1 output of the FFT equals:

$$Y_{l,m} = \frac{1}{T_s} \int_{m T_T}^{m T_T + T_s} r(t) e^{-j((w_0 + \Delta w_0) t + l w_s (t - m T_T))} dt \quad (2)$$

Which gives for carrier 1 of symbol m $$Y_{l,m} = \underbrace{e^{-j\delta w_0 T_s/2} \cdot e^{-j(n w_s + \delta w_0) m T_T}}_{\text{Constant Phase Rotation}} \sum_{k=0}^{N-1} \underbrace{R_{k,m}(-1)^{(k-l-n)} \text{sinc}(k - l - n - \delta w_0 / w_s)}_{\text{Inter Carrier Interference Term}}$$

Phase difference for each carrier between consecutive symbols: $\phi = e^{-j(n w_s + \delta w_0) T_T}$ Conclusions: All carriers are rotated with the same phase from symbol to symbol As continual pilots always carry the same information, then this difference is constant with time. Therefore, the second difference (the difference of the difference) should be zero for all continual pilots, and random values for all data carriers (as data on these carriers are changing from symbol to symbol).

Applying the second phase difference, (the difference of the difference between two consecutive symbols at carrier index k) should lead to a null phase value whatever the frequency offset is. For all the carriers that are not continual pilots, this value shall be a random value.

Each OFDM symbol carries 2k or 8k carriers. Continual pilots (45 or 177) always lie at the same index and are spaced apart as indicated in FIG. 11 a variable distance, e.g. in the 8K mode, there is the sequence of carriers 0, 48, 54, 87, 141, 156. Knowing the theoretical positions of the continual pilots, it is possible to search around the theoretical positions of the continual pilots to locate these zeros in second difference in phase. Further it is assumed that the frequency offsets are the same for all continual pilots in the symbol interval.

Figure 5:
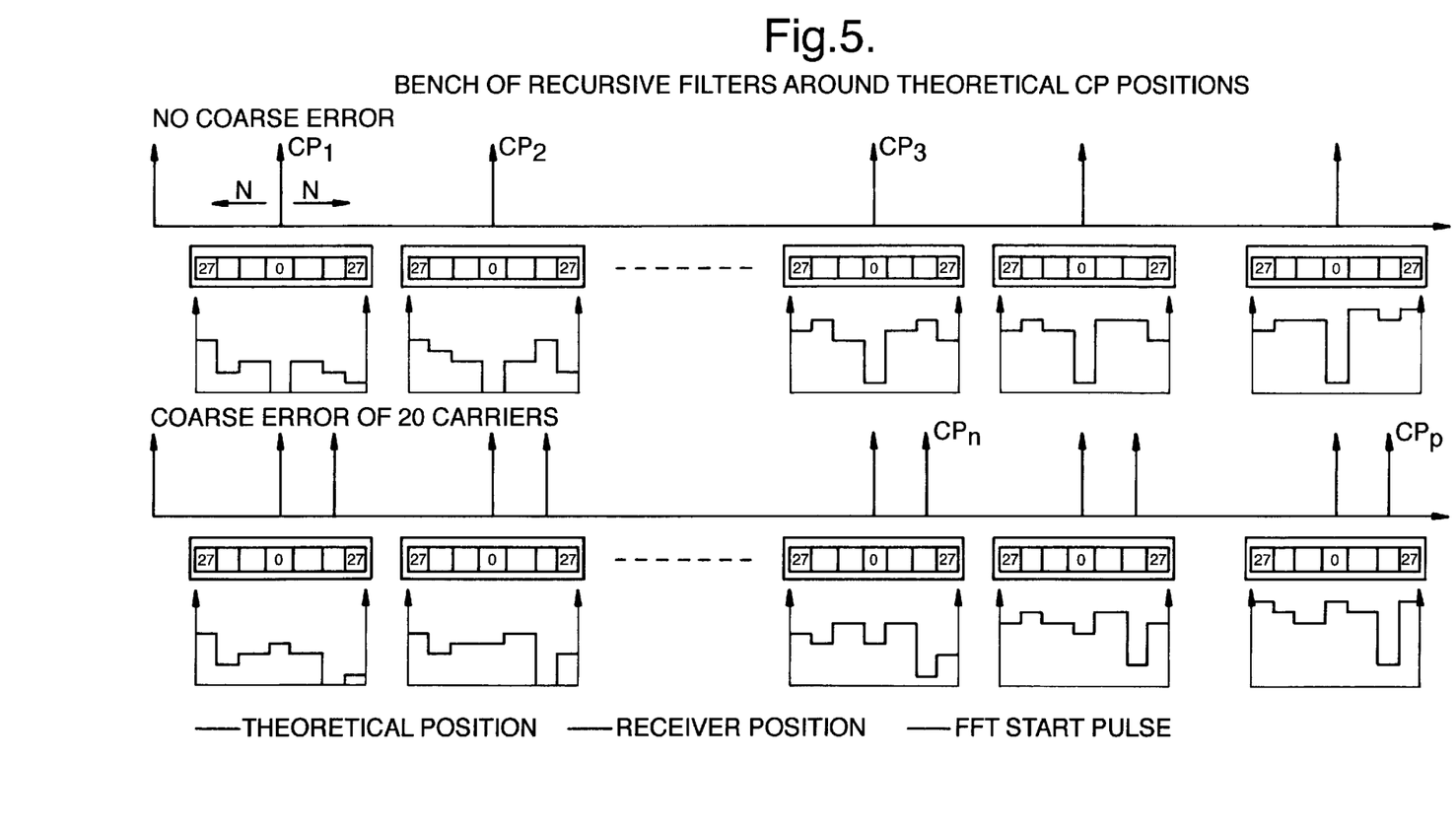
FIG. 5 is a schematic diagram illustrating apparatus for recovering coarse frequency error.

A bank of recursive filters is employed, each filter accumulating the second phase difference for all carriers in the respective carrier position relative to the theoretical position of the continual pilot signal, as indicated in FIG. 5. If a frequency offset of N carriers spacing (usually 47) is to be recovered, accumulator filters are placed around the continual pilot position, N carriers before and N after. These accumulator filters contain the value of the second phase difference. Thus for each continual pilot CP1 . . . CPp, a single bank of 2N+1 filters is employed, each filter (k) accumulating the second phase difference for the carriers occupying the kth position within the search range N either side of the nominal carrier position. Thus, in order to filter the result for better performance, the values of each accumulator filter of index k (between −N and N) shall be added to give an average of the value for that position. Thus, a bank of accumulators contains the average value of the second phase difference, for each carrier of index k (k between −N and N) that lies at a distance of +or −N of every continual pilot. The index of the accumulator containing the smallest value represents the coarse frequency offset.

In order to reduce the number of filters required to a single filter, the accumulated values of the second phase difference for each carrier position may be stored in a suitable storage means and accessed for each new data symbol interval.

Figure 6:
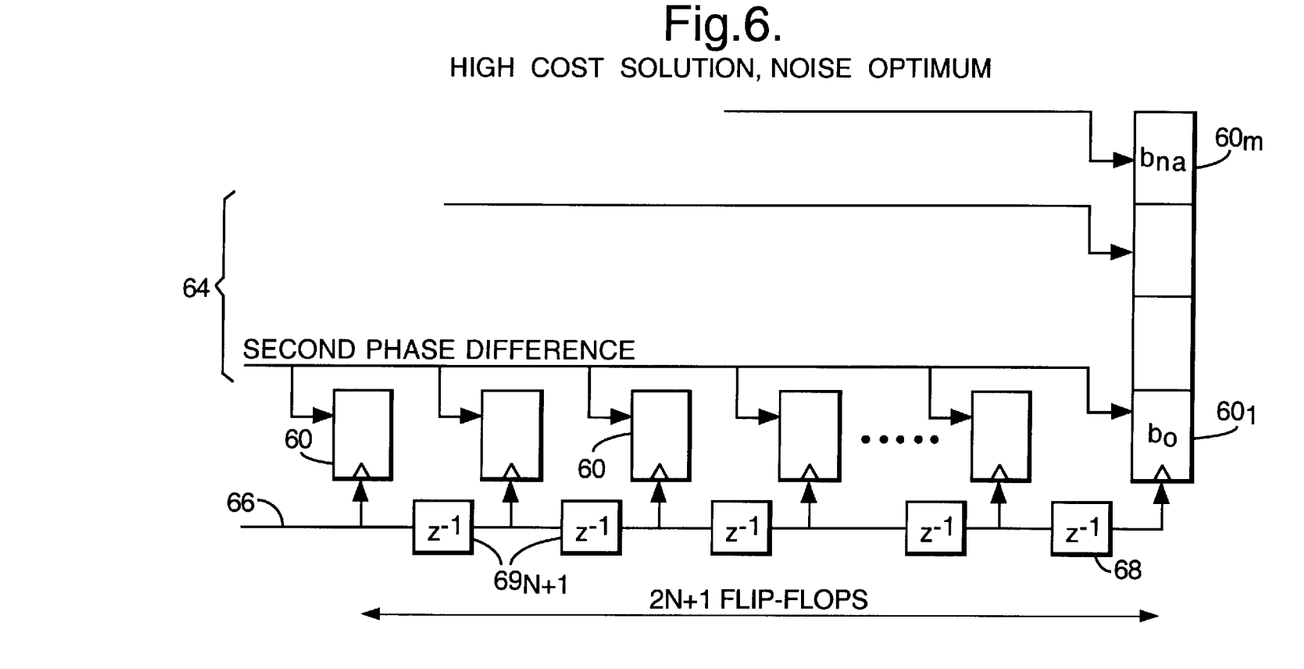
FIGS. 6 and 7 are schematic block diagrams of storage mechanisms for storing filter results for coarse error recovery.

One possible implementation of the memory is shown in FIG. 6, wherein a row of memory locations is implemented by a chain of flip-flop stages 60. Each stage 60 comprises a plurality of m flip-flops 62 to store a word b0 . . . bm representing the value of a second phase difference. The value of a second phase difference computed in a filter F is provided on line 64, and a pulse is provided on enable line 66 for each carrier under consideration. Line 66 includes a chain of delay elements 68. Thus, in operation, when a band of 2N+1 carriers are analyzed for second phase difference, a pulse is applied on line 66 when the first carrier is analyzed. Thus, the value of the second phase difference provided on line 94 is stored in the first flip-flop stage in the chain $60_{-N}$. By the time the value for the second phase difference for the second carrier arrives on line 64, the enable pulse has passed through the first delay element in the chain 68 to enable second flip-flop $60_{-N+1}$. Thus, at the end of a sequence, each flip-flop stage will hold a second phase difference for a respective carrier. The sequence is repeated for each carrier being assessed.

However, it is then necessary to determine which flip-flop stage contains the minimum value representing the continual pilot. The derivation of the minimum is not simple, and is expensive in terms of numbers of logic gates.

Figure 7:
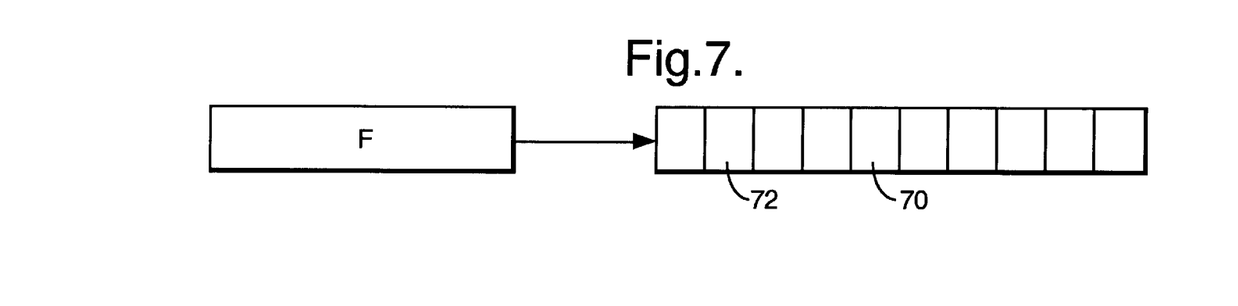

An alternative and preferred method of storage is to implement the memory store 70, as shown in FIG. 7 as RAM, with a row 72 being comprised of 2N+1 memory locations 74 for storing the accumulated second phase difference of each of 2N+1 carriers, and being accessed by a recursive filter F.

However, RAM can only access 1 given address line per clock cycle. Because the continual pilot spacing is not constant, and if N is large (say 47), it is possible to have two or more than two continual pilots that lie in a range of 2N+1 (FIG. 11). If each continual pilot position were selected, then (e.g. k=48, 54, FIG. 11), then a carrier, e.g. at position 30 would be within the search range for each CP position, requiring two simultaneous updates of the second phase difference. The arrangement of FIG. 6 can accommodate such update at two different locations at the same time, but a memory cannot.

Therefore, in accordance with the invention, a subset of the continual pilots is used. This subset shall have the property that no two consecutive pilots are spaced by less than 2N+1 pilots. Thus for example for a search range of ±47, the range 2N+1=95, and for k=255, the search will be carried out between 208 and 302. Thus in the 2K mode, the CPs selected are:

0, 141, 255, 432, 531, 636, 759, 873, 969, 1101, 1206, 1323, 1491, 1683. In addition to these, in the 8K mode, we have: 1791, 1896, 2037, 2136, 2235, 2340, 2463, 2577, 2673, 2805, 2910, 3027, 3195, 3387, 3495, 3600, 3741, 3840, 3939, 4044, 4167, 4281, 4377, 4509, 4614, 4731, 4899, 5091, 5199, 5304, 5445, 5544, 5643, 5748, 5871, 5985, 6081, 6213, 6318, 6435, 6603, 6795. Thus it will be seen the groups selected are non-overlapping and essentially contiguous.

It will be understood that in many of groups of carriers searched, there will be more than one CP present. However the process of filtering over many groups will filter out any false selection made in one group.

As normally only one continual pilot is present in the 2N+1 range, then the derivation of the minimum can be easily done "on the fly", by a continuous updating process.

The overall process is the following:

When a continual pilot position is detected, the system enters the SWEEP mode, if it was not already SWEEPING. Then, for 2N+1 carriers, the system is going to accumulate the new value in the register of index k (k grows from −N to N). If the new value is smaller than the local minimum, then the minimum is updated to the register content, and the index of the minimum is set to k.

After 2N+1 carriers, the mechanism stalls until the next continual pilot arrives. When all the continual pilots have been received, the index of the minimum contains the reliable index of the minimum, which in turn gives the coarse frequency offset.

Figure 8:
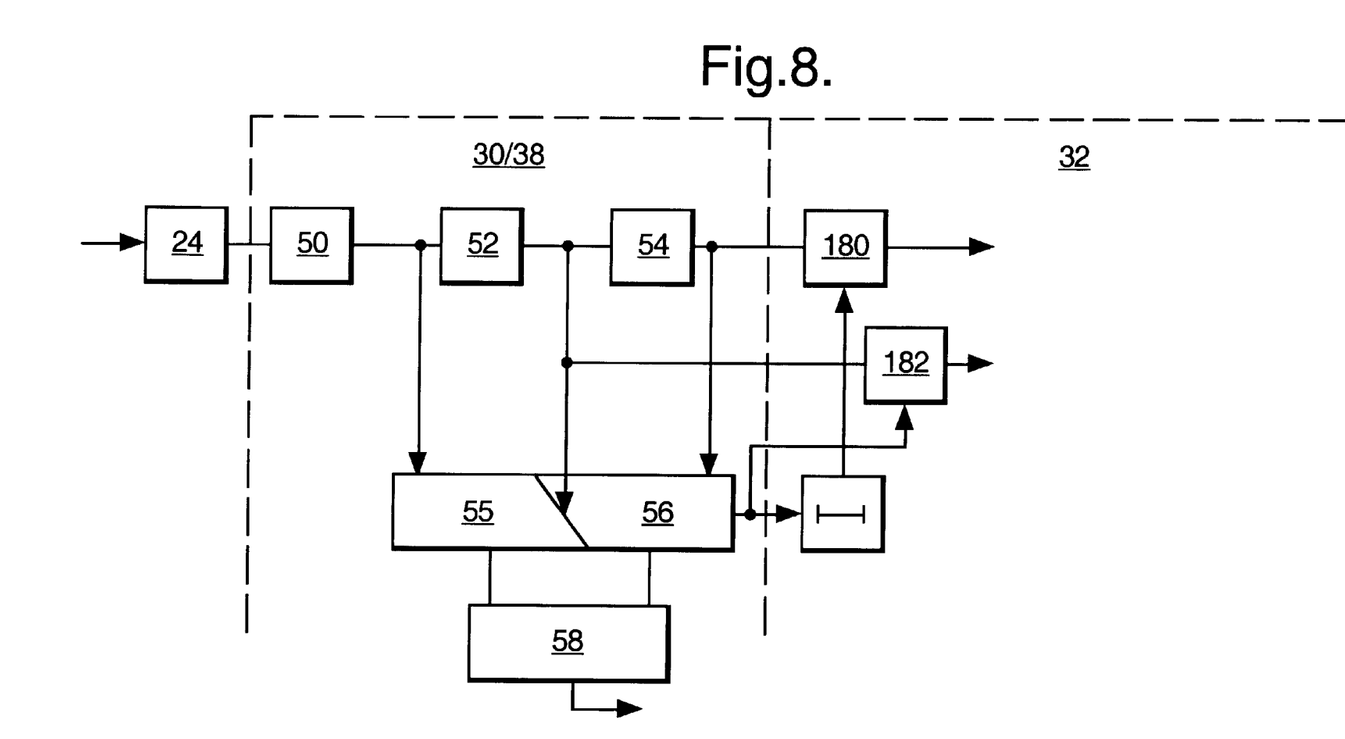
FIG. 8 is a more detailed block diagram of a common phase error/AFC circuit together with a channel equaliser circuit.

Referring now back to the specific embodiment and to FIG. 8, this shows certain elements of FIG. 2 in more detail, in particular the common phase error circuit 30 which is combined with AFC circuit 38, and comprises a complex to phase format converter 50 for converting the symbol values output from FFT unit 50 to a phase format. These converted symbol values are fed into delay elements 52, 54, and subtractor units 55, 56 derive the phase difference between the current signal and that stored in element 52, and the phase difference between the symbols stored in elements 52, 54. These phase differences are used to control phase error correction circuits 180, 182. In addition a subtractor 58 is used to determine the difference between the two signals provided by subtractors 55, 56. The output second difference signal is used for coarse frequency control, as indicated below.

The incoming data are denoted by c(l,n) where l is the symbol number and n is the slot number within the symbol. Note that this is not the same as the carrier number k, because this block must start processing before the nominal position of the first carrier to allow for a coarse frequency error.

The incoming complex values are converted to phase:

$$\theta(l, n) = \frac{1}{2\pi}\arg[c(l, n)]$$

where the argument function is defined such that $-\pi \leq \arg(z) < \pi$.

c(l,n) is also delayed by one and two symbols and converted to phase to give θ(l−1,n) and θ(l−2,n) in delay elements 52, 54.

The first difference of phase is calculated for the current and previous symbols in subtractor units 55, 56.

$$\phi(l,n)=[\theta(l,n)-\theta(l-1,n)]\bmod 1.0$$

$$\phi(l-1,n)=[\theta(l-1,n)-\theta(l-2,n)]\bmod 1.0$$

The second difference is also calculated in further subtractor unit 58.

$$\Psi(l,n)=[\phi(l,n)-\phi(l-1,n)]\bmod 1.0$$

The differences are calculated modulo 1.0, i.e. they are all between −0.5 and +0.5.

Figure 9:
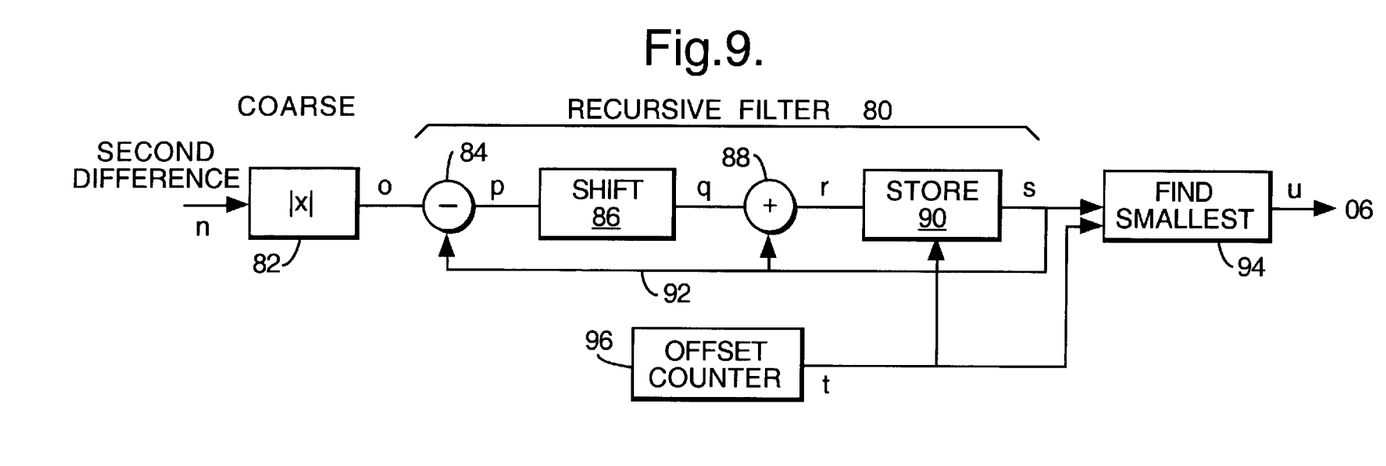
FIG. 9 is a detailed block diagram of coarse AFC control.

Referring to FIG. 9, a recursive filter 80 is shown. The magnitude of the second difference $\Psi$ (obtained from subtractor unit 58) for each carrier is obtained in unit 82 and applied to filter 80 comprising subtractor 84, scaler 86, summer 88 and memory store 90, and a feedback loop 92 to summer 88 and subtractor 84. A unit 94 determines the smallest value in store 90 and provide as an output the address of the location holding the smallest value, i.e. the carrier spacing offset from the nominal CP position. Store 90 and unit 94 are controlled by an offset counter 96, thus it may be seen that the determination of the minimum is done "on the fly", since as a new carrier is processed, the determined second difference is compared in unit 94, with the previous minimum, and the smaller value is selected.

Store 90 corresponds to the row 72 of the RAM 70 of FIG. 7.

Thus the coarse AFC uses a bank of recursive filters having an output $\gamma_\Delta(l,n)$ in which each value of $\Delta$ corresponds to a different trial frequency offset. The search range is given by $-47 \leq \Delta \leq 47$. Each filter is updated only when the current slot would contain a continual pilot for its particular value of $\Delta$ (see above). the input to all of the filters is the rectified value of the second difference of phase. This will have a small average value only for the correct offset, because the first difference will be similar each time. The update rule for the output of the filter is:

$$\gamma_\Delta = \begin{cases} (1-R)\gamma_\Delta(l,n-1) + R|\psi(l,n)| & (n - N_0 - \Delta) \in C_R \\ \gamma_\Delta(l,n-1) & \text{otherwise} \end{cases}$$

where R is the scaling factor applied by scaler 86. Where $C_R$ is a subset of C chosen such that at most one store needs to be updated for each slot as explained above. The store which needs to be updated, if any, is the one for which $\Delta = n - N_0 - N_C$, where $N_C \in C_R$.

After all of the filter stores have been updated for a given CP, the coarse AFC output is set to the value of $\Delta$ corresponding to the store containing the smallest value:

$$\Delta_c = \arg_\Delta \min \gamma_\Delta$$

The algorithm can be expressed as follows:

if $((n - N_0 + 47) \in C_R$ && sweep = false)

{

$\Delta = -47$;

sweep = true;

$\gamma_{min} = 0.5$;

$\Delta_{min} = 0$;

}

-continued if (sweep)

{

$\gamma_\Delta = (1 - R)\gamma_\Delta + R|\psi|$;

if $(\gamma_\Delta < \gamma_{min})$

{

$\gamma_{min} = \gamma_\Delta$;

$\Delta_{min} = \Delta$;

}

$\Delta = \Delta + 1$;

if $(\Delta > 47)$

{ sweep = false;

$\Delta_C = \Delta_{min}$;

}

} where the flag sweep starts with the value false. The important value to be defined from this process is the offset value $\Delta_c$, which represents the coarse frequency offset in terms of number of carrier spacings.

Two methods are used for combining coarse and fine measurement.

METHOD 1

This method simply adds the two measures together, since the coarse measure is an integer giving the number of whole carriers offset, while the fine measure gives fractions of a carrier.

$$E = \Delta_c + \phi_W$$

METHOD 2

In this method the fine part is only considered if the coarse value is zero. The coarse value is also clipped to the range −1 to +1:

$$E = \begin{cases} -1 & \Delta_c < 0 \\ \phi_w & \Delta_c \equiv 0 \\ 1 & \Delta_c > 0 \end{cases}$$

The frequency error value E is fed into a loop filter, which consists simply of an integrator:

$$v(l) = v(l-1) + E|_{n-N_{max}}$$

The integrator is clocked once per symbol, at the end of the symbol. This value is fed to a DAC which can be used to generate the AFC control voltage if analog AFC is being used. The value is also fed to the DDFS if digital AFC is being used.

Figure 10:
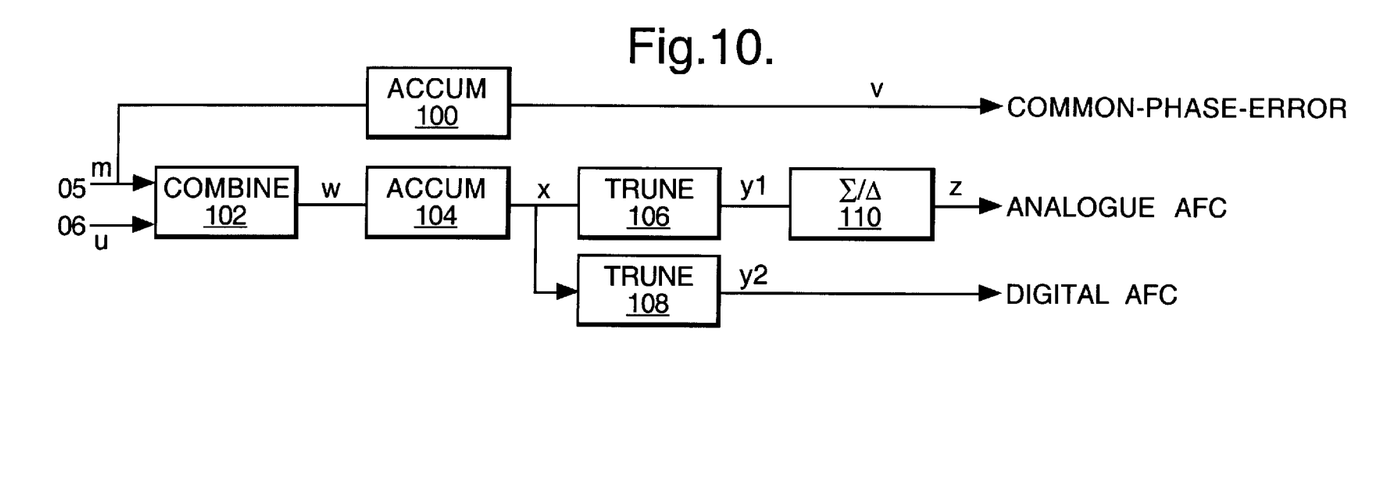
FIG. 10 is a block diagram of a circuit for providing CPE and AFC control from the circuits of FIG. 9.

Referring now to FIG. 10, this shows a circuit for combining the outputs of the fine and coarse error circuits. The input O5 is applied to an accumulator 100 which provides a common-phase-error signal. The signal O5 is also applied to a combining circuit 102 where it is combined with the output O6 from FIG. 9 in order to provide a summed signal which is applied to an accumulator 104. The output of accumulator 104 is applied to truncation circuits 106, 108. The output from truncation circuit 108 may be used for digital automatic frequency control where the signal is applied to a DDFS circuit at the input of FFT unit 24; alternatively the output from truncation circuit 106 is applied to a Σ/Δ digital to analog converter circuit 110 in order to provide a signal for analog automatic frequency control where the frequency of a local oscillator in the down-converter stage is controlled.

The present invention presents an optimised way to recover the Coarse frequency Offset. The features of this invention are:

1) No continual pilot overlapping
2) Use a subset of the continual pilots
3) Single RAM storage
4) On the fly IIR filtering
5) On the fly minimum search

What is claimed is:

1. An apparatus for demodulating digital video broadcast signals comprising data modulated on a multiplicity of spaced carrier frequencies, comprising:

analog-to-digital conversion means for providing a series of digital samples of the broadcast signal;

transform means for analyzing the samples to provide a series of data signal values for each carrier frequency;

signal processing means for processing the series of data signal values including phase-error-correcting means; and automatic frequency control means for controlling the frequency of the signals input to the transform means;

wherein the automatic frequency control means includes coarse frequency control means for controlling the frequency in terms of increments of the spaced carrier frequency, and fine frequency control means for controlling the frequency for values less than a single carrier frequency interval; and wherein the coarse frequency means includes a filter means for assessing a predetermined number (N) of carrier signals on either side of the nominal position of a plurality of predetermined continual pilot signals, to determine which signal best represents the continual pilot signal, thereby to determine a coarse frequency error.

2. An apparatus according to claim 1, including means for determining the rate of change of phase of said predetermined number of carrier signals between consecutive symbol intervals, and applying the same as inputs to the filter means.

3. An apparatus according to claim 2, wherein the filter means comprises recursive filter means for providing an output representative of the accumulated value of a plurality of previous input values, and means for selecting the carrier associated with the minimum output value as representing the position of a continual pilot signal.

4. An apparatus according to claim 3, wherein the filter means comprises a difference means coupled to the filter input, to provide an input signal to a store means, the output of the store means being fed back to the difference means, so that the output of the difference means represents the difference between the filter input and the output of the store means.

5. An apparatus according to claim 4, wherein the filter means has access to a store means for storing, in respective store locations, assessment values produced by the filter means representing the respective carriers being assessed.

6. An apparatus according to claim 5, wherein the store means comprises an area of RAM, with said values being stored in respective memory locations in the RAM.

7. An apparatus according to claim 6 including an offset counter for shifting the address of the location within the store means for storing the values at different locations.

8. An apparatus according to claim 4, including an offset counter for shifting the address of the location within the store means for storing the values at different locations.

9. An apparatus according to claim 8, including means for assessing the values within the store means and providing the value of the offset counter, corresponding to the best representing signal, as the coarse frequency error.

10. An apparatus according to claim 9, including means for combining the coarse and fine error signals and applying the combined value either via an ADC to a down-conversion stage or via a DDFS to the input of the transform means.

11. An apparatus according to claim 10, wherein the transform means is a fast Fourier transform means.

12. An apparatus according to claim 9, wherein the transform means is a fast Fourier transform means.

13. An apparatus according to claim 12, wherein a subset of continual pilot signals are assessed whose nominal positions are spaced at least a predetermined number (2N+1) of carriers apart.

14. An apparatus according to claim 13 wherein N=47.

15. An apparatus according to claim 13, wherein continual pilot signals are selected for assessment by selecting a first pilot signal, and determining which is the net pilot signal in the sequence more than (2N+1) carriers from the first pilot signal.

16. An apparatus according to claim 1, wherein the filter means has access to a store means for storing, in respective store locations, assessment values produced by the filter means representing the respective carriers being assessed.

17. An apparatus according to claim 1, wherein the transform means is a fast Fourier transform means.

18. An apparatus according to claim 1, wherein a subset of continual pilot signals are assessed whose nominal positions are spaced at least a predetermined number (2N+1) of carriers apart.

19. An apparatus according to claim 18, wherein N=47.

20. An apparatus according to claim 1, wherein continual pilot signals are selected for assessment by selecting a first pilot signal, and determining which is the next pilot signal in the sequence more than (2N+1) carriers from the first pilot signal.

21. A method for demodulating digital video broadcast signals comprising data modulated on a multiplicity of spaced carrier frequencies, the method comprising:

analog to digital conversion for providing a series of digital samples of the broadcast signal;

analyzing the samples to provide a series of data signal values for each carrier frequency;

processing the series of data signal values including a phase-error-correction; and automatic frequency control of the frequency used in the analyzing of the samples;

wherein the automatic frequency control includes coarse frequency control for controlling the frequency in terms of increments of the spaced carrier frequencies, and fine frequency control for controlling the frequency for values less than a single carrier frequency interval; and wherein the coarse frequency control includes assessing a predetermined number (N) of carrier signals on either side of the nominal position of a plurality of predetermined continual pilot signals, to determine which signal best represents the continual pilot signal, thereby to determine a coarse frequency error.

* * * * *